United States Patent
Aboujaib et al.

(10) Patent No.: US 9,410,486 B2
(45) Date of Patent: Aug. 9, 2016

(54) SYSTEM AND METHOD FOR WASHING AND PURGING THE LIQUID FUEL SYSTEM OF A TURBINE WITH WATER

(75) Inventors: Maher Aboujaib, Evette Salbert (FR); Daniel Deloge, Belfort (FR)

(73) Assignee: GE Energy Products France SNC, Belfort (FR)

( * ) Notice: Subject to any disclaimer, the term of this patent is extended or adjusted under 35 U.S.C. 154(b) by 1209 days.

(21) Appl. No.: 13/127,902

(22) PCT Filed: Nov. 5, 2009

(86) PCT No.: PCT/FR2009/052139
§ 371 (c)(1),
(2), (4) Date: Jul. 21, 2011

(87) PCT Pub. No.: WO2010/052434
PCT Pub. Date: May 14, 2010

(65) Prior Publication Data
US 2011/0277480 A1    Nov. 17, 2011

(30) Foreign Application Priority Data
Nov. 6, 2008 (FR) ...................... 08 57531

(51) Int. Cl.
| F02C 7/232 | (2006.01) |
| F02C 7/22 | (2006.01) |
| F01D 25/00 | (2006.01) |
| F23K 5/18 | (2006.01) |
| F23K 5/04 | (2006.01) |

(52) U.S. Cl.
CPC ................ *F02C 7/22* (2013.01); *F01D 25/002* (2013.01); *F02C 7/232* (2013.01); *F23K 5/04* (2013.01); *F23K 5/18* (2013.01); *F23D 2209/30* (2013.01); *F23K 2301/203* (2013.01)

(58) Field of Classification Search
CPC .............. F02C 7/22; F02C 7/232; F23K 5/04; F23K 5/18; F23K 2301/203; F01D 25/002; F23D 2209/30
See application file for complete search history.

(56) References Cited

U.S. PATENT DOCUMENTS

| 6,250,065 B1 * | 6/2001 | Mandai .................. F02C 7/232 60/39.094 |
| 6,256,975 B1 | 7/2001 | Dobbeling et al. |
| 6,438,963 B1 * | 8/2002 | Traver ..................... F23K 5/147 60/39.094 |
| 2002/0026784 A1 * | 3/2002 | Nakamoto ............ F01D 25/002 60/39.094 |
| 2002/0026786 A1 * | 3/2002 | Nakamoto ............ F01D 25/002 60/39.094 |
| 2008/0098994 A1 | 5/2008 | Innes et al. |

FOREIGN PATENT DOCUMENTS

| EP | 0952317 | 10/1999 |
| EP | 1184623 | 3/2002 |
| EP | 1199454 | 4/2002 |

OTHER PUBLICATIONS

Form PCT/ISA/210, WO, Sep. 24, 2010, ISR for PCT/FR2009/052139.

* cited by examiner

*Primary Examiner* — William H Rodriguez
*Assistant Examiner* — Scott Walthour
(74) *Attorney, Agent, or Firm* — Mintz Levin Cohn Ferris Glovsky and Popeo, P.C.; Steven M. Jensen

(57) ABSTRACT

This system for supplying a turbine with liquid fuel comprises a liquid fuel inlet (3), a piping assembly (4) connecting the inlet to the turbine, and draining means for draining at least a portion of the said piping assembly.

The draining means comprise water inlet means (9) and a system of controllable valves suitable for injecting water into at least one of the said portions of the piping assembly.

10 Claims, 12 Drawing Sheets

SYSTEM AND METHOD FOR WASHING AND PURGING THE LIQUID FUEL SYSTEM OF A TURBINE WITH WATER

This application is the U.S. national phase, pursuant to 35 U.S.C. §371, of PCT international application Ser. No. PCT/FR2009/052139, filed Nov. 5, 2009, designating the United States and published in French on May 14, 2010 as publication WO 2010/052434 A2, which claims priority to French application Ser. No. 0857531, filed Nov. 6, 2008. The entire contents of the aforementioned patent applications are incorporated herein by this reference.

The present invention relates to the field of gas turbines and the supplying of such gas turbines.

It applies in particular to the gas turbine systems using two types of fuel such as gas and fuel oil. It applies also to any machine supplied on the basis of a liquid fuel and for which, when stopped, the fuel is likely to stagnate, at high temperature, and in the presence of air.

The combustion systems of industrial gas turbines burn a mixture of oxidant, such as oxygen, and fuel, such as gas or liquid fuel oil. Gas turbines using two types of fuels usually do not burn both fuels at the same time. When the turbine burns a fuel, the supply of the other fuel is stopped and vice versa. The operation, which consists in changing the fuel for supplying the turbine is conventionally designated by the term "changeover". Following this changeover operation or for any other reason, the supply circuit of one of the fuels is stopped.

For this type of machine, the liquid fuel stagnating at high temperature and in the presence of air may coagulate or solidify. The phenomenon is well known in the case of fuel oil and is called "coking". This solidification of the fuel oil is manifested in the deterioration of the sensitive elements of the machine, of the sealing function of the mechanical components (valves, non-return valve elements, etc.) and by a reduction in the speed of flow of the liquid fuel in the machine or its supply (piping).

In the prior art, it is known practice to carry out an air draining following the stopping of a supply circuit, in the event for example of a change of supply of a turbine from a liquid fuel to a gaseous fuel. This air draining of the liquid fuel is designed to clean the supply circuit in the high-temperature zones close to the turbine. This makes it possible to prevent the stagnant liquid fuel from being in the presence of high temperatures. It has been found that the existing air solutions have a limited effect. Specifically, when the air drains the liquid fuel, since air can be compressed, variations in the flow of drained liquid fuel to the combustion chamber are possible, which involves power surges. This air draining causes the accumulation of air (piping, valve element, valves) in the supply circuit which again means power surges. These power surges are all the more problematical since they may trigger a safety device such as a circuit breaker. More generally, since the air contributes to the degrading of the liquid fuel, it is desirable to avoid it.

An example of an air draining system is described in document EP 1 184 623.

In view of the foregoing, the object of the invention is to alleviate the drawbacks of the conventional machines and in particular to prevent the presence of a stagnant liquid fuel which, in the presence of air and at high temperature, creates a residue in the supply circuit of the machine, which tends to solidify, a phenomenon known as coking in the case of fuel oil.

The subject of the present invention is therefore a system for supplying a turbine with liquid fuel comprising a liquid fuel inlet, a piping assembly connecting the said inlet to the turbine, and draining means for draining at least a portion of the said piping assembly.

According to one feature of this system, the draining means comprise water inlet means and a system of controllable valves suitable for injecting water into at least a portion of the piping assembly.

According to another feature, with the turbine comprising water supply means, the water inlet means are supplied from the said supply means. This makes it possible to not install an additional water circuit. The draining may, for example, be carried out with demineralized water already used for Nox reduction.

According to an additional feature, the system comprises a non-return valve element placed between the liquid fuel inlet and the turbine, the valve system being connected upstream of the said valve element.

The system may also comprise a pressurized draining air inlet placed downstream of the non-return valve element.

In the envisaged embodiments, the command means are for example suitable for controlling the valve system according to a first supplying phase for supplying the turbine with the said fuel and a second draining phase for draining by injection of water into at least a portion of the piping assembly.

The command means may also be suitable for controlling the pressurized draining air inlet so that an injection of air is performed subsequent to the injection of water downstream of the non-return valve element as appropriate.

According to the first embodiment, the system of valves comprises a three-way valve connecting either a drain or the water inlet means to a multi-way water inlet valve connected to the piping assembly.

According to another embodiment, the system of valves comprises a first multi-way valve connected between the piping assembly and the water inlet means, a second valve placed between the piping assembly and a drain and a third valve placed in the piping assembly, downstream of the fuel inlet.

For example, the system comprises a three-way valve placed between the first valve and the water inlet means in order to connect the first valve either to a drain or to the said water inlet means.

According to another additional feature of this embodiment, the connection point of the first valve is situated downstream of the connection point of the second valve.

In the envisaged embodiments, a flow regulator is placed between the multi-way valve and the piping assembly.

According to an additional feature of the envisaged embodiments of this system, for supplying a turbine with at least two fuels, a first liquid fuel is fuel oil and a second is gas, the turbine operating with at least these two fuels.

In one application, the supply system may be used in a turbine.

A further subject of the invention is a method for draining a turbine, comprising the steps of:
 draining fuel by injection of water into at least a portion of a piping assembly of a system for supplying the turbine;
 and draining the water by injection of air into a portion of the piping assembly situated downstream of the non-return valve element and by injection of the fuel into a portion of the piping assembly situated upstream of the non-return valve element.

According to one feature of this method, the draining phase is performed following a change of supply from a first fuel to a second fuel. For example, the first, liquid fuel is liquid fuel oil and the second fuel is gas.

The invention will be better understood on studying the detailed description of an embodiment taken as a non-limiting example and illustrated by the appended drawings in which.

Figure 1:
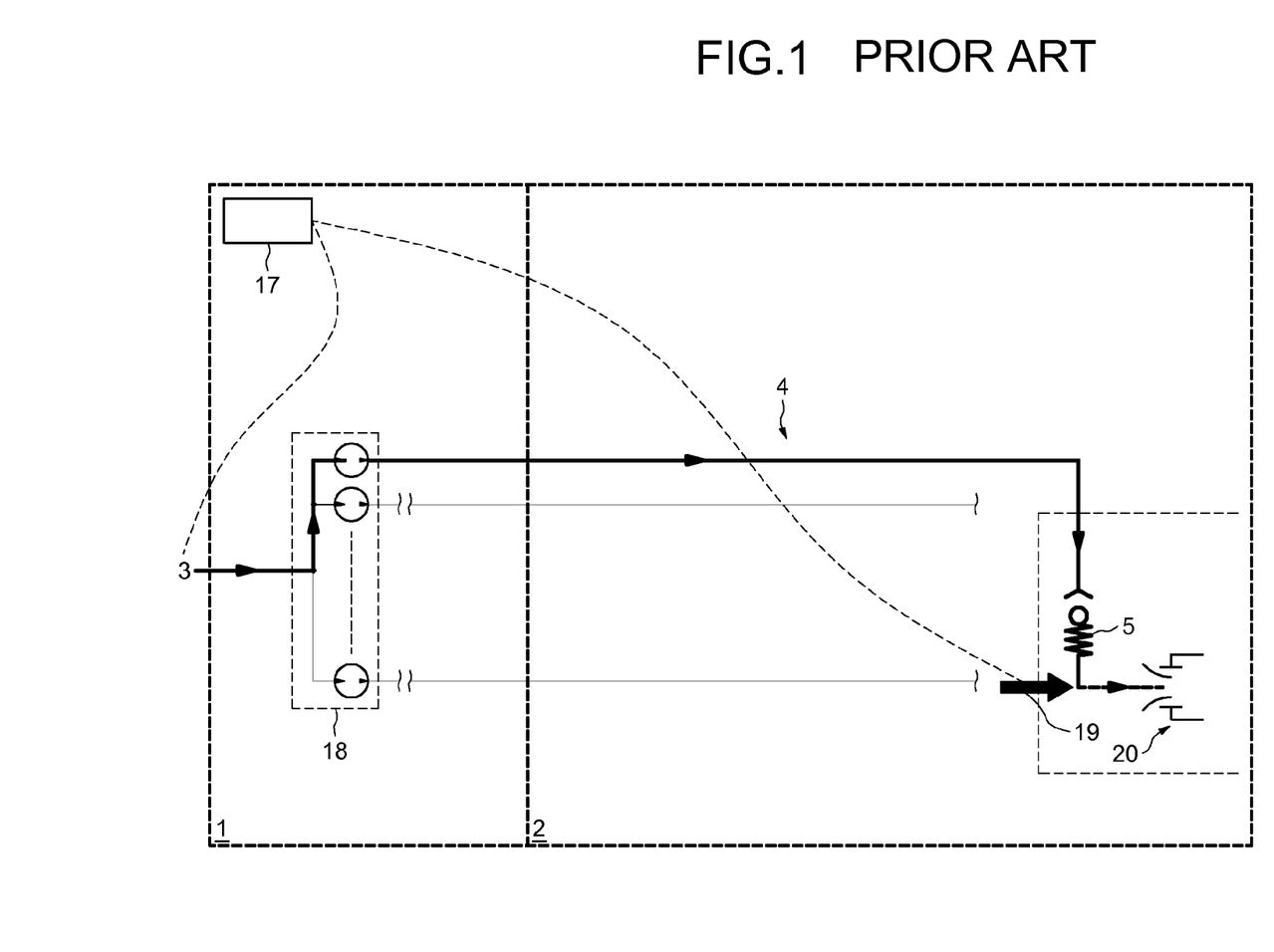
FIG. 1 represents a system for supplying a turbine according to the current state of the art.

Considering FIG. 1, it shows a system for supplying with liquid fuel according to the prior art. As can be seen, the system for supplying a conventional gas turbine comprises a turbine compartment 2 and an auxiliary compartment 1. This figure shows the arrangement of the components in these two compartments.

The auxiliary compartment comprises a flow divider 18, a liquid fuel inlet 3, command means 17 and a portion of a piping assembly 4 which supplies each of the combustion chambers of the turbine compartment 2. The turbine compartment comprises, in addition to the combustion chambers, the rest of the piping assembly which allows the fuel to be conveyed to the chambers and the fuel non-return valve elements 5 associated with each line. Downstream of each non-return valve element 5, the gas turbine compartment comprises an atomization air inlet 19 and an injector 20 into the combustion chamber of the gas turbine. The command means 17 control the atomization air inlet 19 and the fuel inlet 3. The non-return valve element 5 makes it possible to prevent gas returning from the chamber to the circuit and any contact between the fuel and the air at approximately 200° C. The liquid fuel inlet 3, the pressure of which can be regulated, operates at a sufficient pressure to open the non-return valve elements.

Each of these two compartments 1 and 2 usually operates in different temperature conditions. Thus the average temperature in the auxiliary compartment 1 is approximately 65° C., while, in the turbine compartment 2, the temperature is regulated to approximately 130° C. by forced ventilation, the means of which are not shown. However, close to the turbine the temperature may reach approximately 250° C. due to the thermal radiation.

As indicated above, when stopped, the presence of stagnant fuel at high temperature and in the presence of air in particular in the turbine compartment 2 is likely to present a certain number of major drawbacks.

Figure 2:
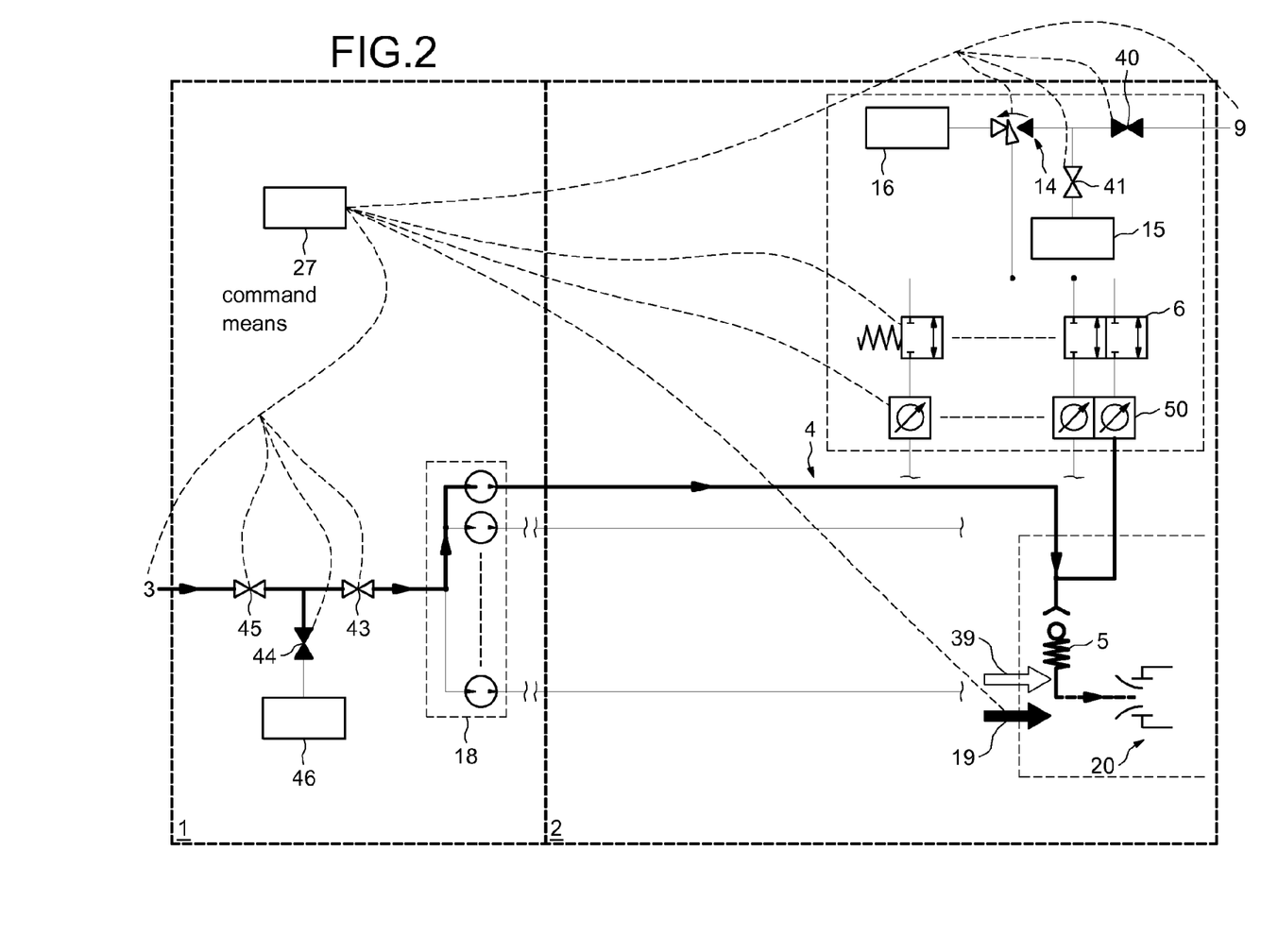
FIG. 2 represents a first embodiment of a system for supplying a turbine provided with draining means.

Shown in FIG. 2 is a supply system making it possible to alleviate these drawbacks.

This supply system also comprises a fuel inlet 3, a flow divider 18, a piping assembly 4, a valve element 5, an atomization air inlet 19, an injector 20 and command means 27 (i.e., a controller). These elements have functions identical to those described with reference to FIG. 1. As shown in FIG. 2, the system is supplemented by means for draining at least a portion of the piping assembly. The draining system comprises a multi-way valve 6, a three-way valve 14, several single valves 40, 41, 43, 44, 45, two drains 16 and 15, a draining air inlet 39, a flow regulator 50, command means 27 and a water inlet 9. The water inlet 9 upstream makes it possible, for example by means of a water pump which may be that of the water injection circuit, to supply the flow and the pressure of water that are necessary for the draining system.

The valve 40 is situated between the water inlet and the three-way valve. Between the valves 40 and 14 there is the connection point of the valve 41 which is connected to the drain 15. The three-way valve 14 connects the valve 6 either to the valve 40 or to the drain 16. Downstream of the valve 14 is the multi-way valve 6; each of the lines is connected to a liquid fuel line of the piping assembly 4 via the flow regulator 50.

Upstream of the flow divider of the liquid fuel circuit, three single valves 43, 44, 45 have been placed. The valve 43 being directly connected to the flow divider, the valve 45 is just upstream of the valve 43. Between the valves 43 and 45 there is the connection point of the valve 44 that is connected to the drain 46.

The single valves 40, 41, 43, 44, 45 have a role of isolating the liquid fuel circuit from the water and the water circuit from the liquid fuel. Therefore, during the water draining, the water does not return to the liquid fuel inlet 3. And during the draining with liquid fuel or filling of the lines, the liquid fuel does not return to the water inlet. This is so even in the case of an operating error. The flow regulator 50 regulates the flow of the water on each line and makes it possible to prevent too much liquid fuel being pushed by the water, which could disrupt the operation of the turbine by power surges and an inappropriate triggering of the circuit-breaker alarm.

The system of valves 6, 14, the flow regulator 50, the water inlet 9, the fuel inlet 3, the atomization air inlet 19, the draining air inlet 39 and the single valves 40, 41, 43, 44, 45 are controlled by the command means 27 in order to allow the placing in the supply system of several configurations corresponding to a liquid fuel supply of the turbine or to draining operations of the supply system.

In a first phase also shown in FIG. 2 corresponding to a liquid fuel supply of the turbine, the flow of liquid fuel is constant, the multi-way valve 6 is closed and connected by the three-way valve 14 to the drain 16. The single valves 45, 43 are controlled to allow the liquid fuel to pass and to stop the water. The valve 44 is closed to the drain and the valve 41 is opened.

Then, the liquid fuel supply circuit is stopped. Progressively, the pressure and the flow in the supply circuit reduce. This stoppage can be a simple stoppage in the case of a common turbine or a stoppage due to a changeover in the case of a turbine using two different fuels.

As appropriate, if a second fuel is used, an equivalent volume of it must be supplied to the turbine so as not to disrupt the combustion and the supply circuit of the second fuel (not shown). The draining system as described in FIG. 2 is used during a shutdown in the presence of air. This shutdown is not necessarily the consequence of a fuel changeover. Thus, the draining system as described in FIG. 2 may be used during a complete shutdown of the fuel turbine.

The connection-point zone of the first multi-way valve 6 is situated upstream of the non-return valve element 5. This connection point makes it possible to reach, with the water, both the zone downstream and upstream of the connection point, as is explained below. As appropriate, the two fuels used with the turbine may be fuel oil with respect to the liquid fuel and gas with respect to the other fuel.

Preferably, the connection point of the first valve 6 is close to the non-return valve element 5. With the turbine supply systems using water injection means, not shown here, the water inlet 9 can be taken from this water injection system.

Figure 3:
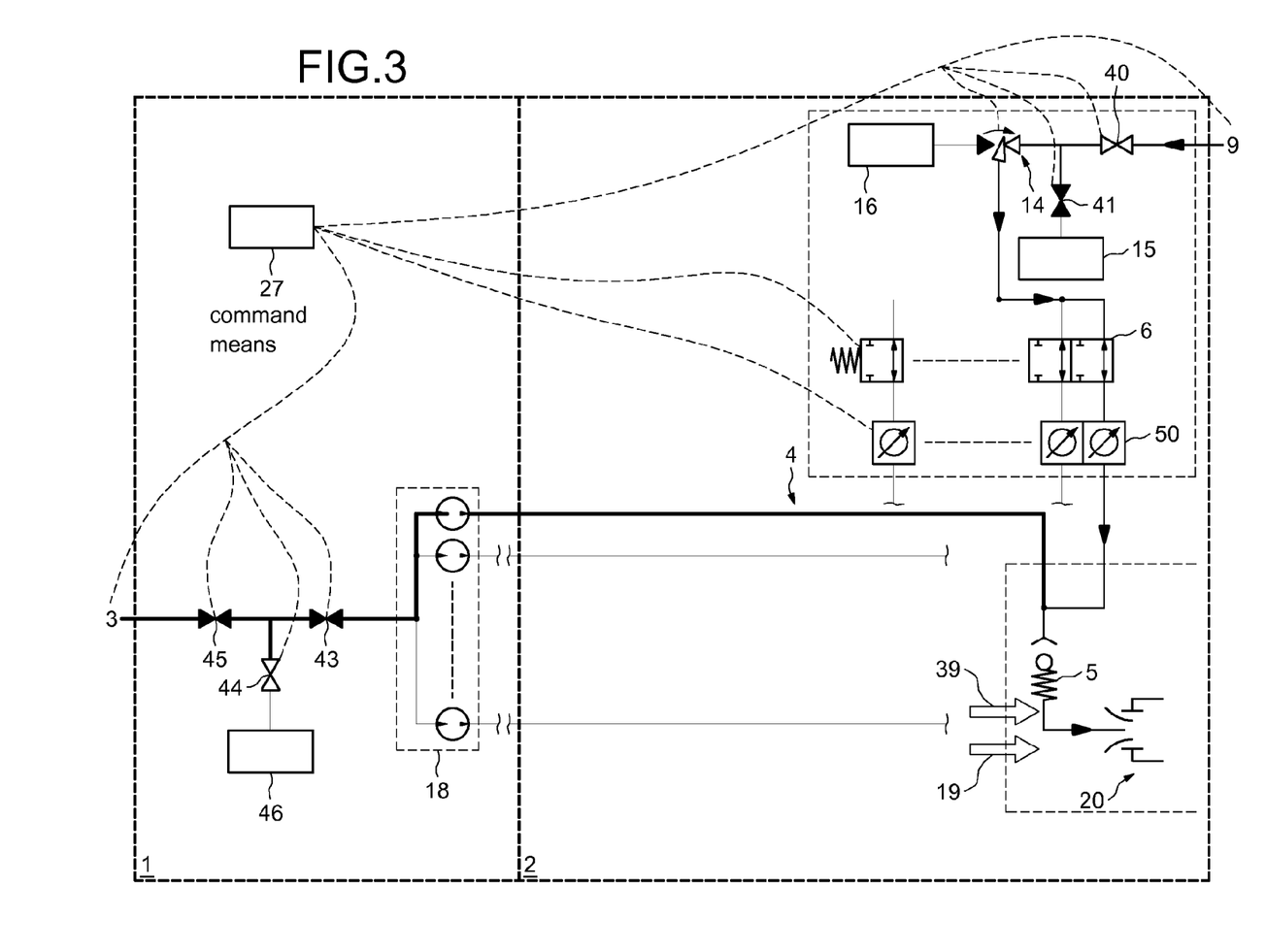
FIG. 3 illustrates, according to a first embodiment, the draining of the liquid fuel downstream of the non-return valve elements.

FIG. 3 represents the draining of the liquid fuel downstream of the non-return valve elements or first step of draining. As shown in FIG. 3, the three-way valve 14 connects the valve 6 to the valve 40. The valves 40, 44 and 6 are opened, while the valves 41, 43, 45 are closed. In this configuration, the water arriving at the piping assembly is stopped by the liquid fuel and is directed to the non-return valve element. The pressure of the water inlet 9 is higher than the pressure to overcome the non-return valve element 5. The water therefore pushes the stagnant liquid fuel and its traces towards the combustion chamber. The flow regulator allows a constant flow of pushed liquid fuel. The downstream portion of the non-return valve elements is therefore drained and this is done with no power surge.

Figure 4:
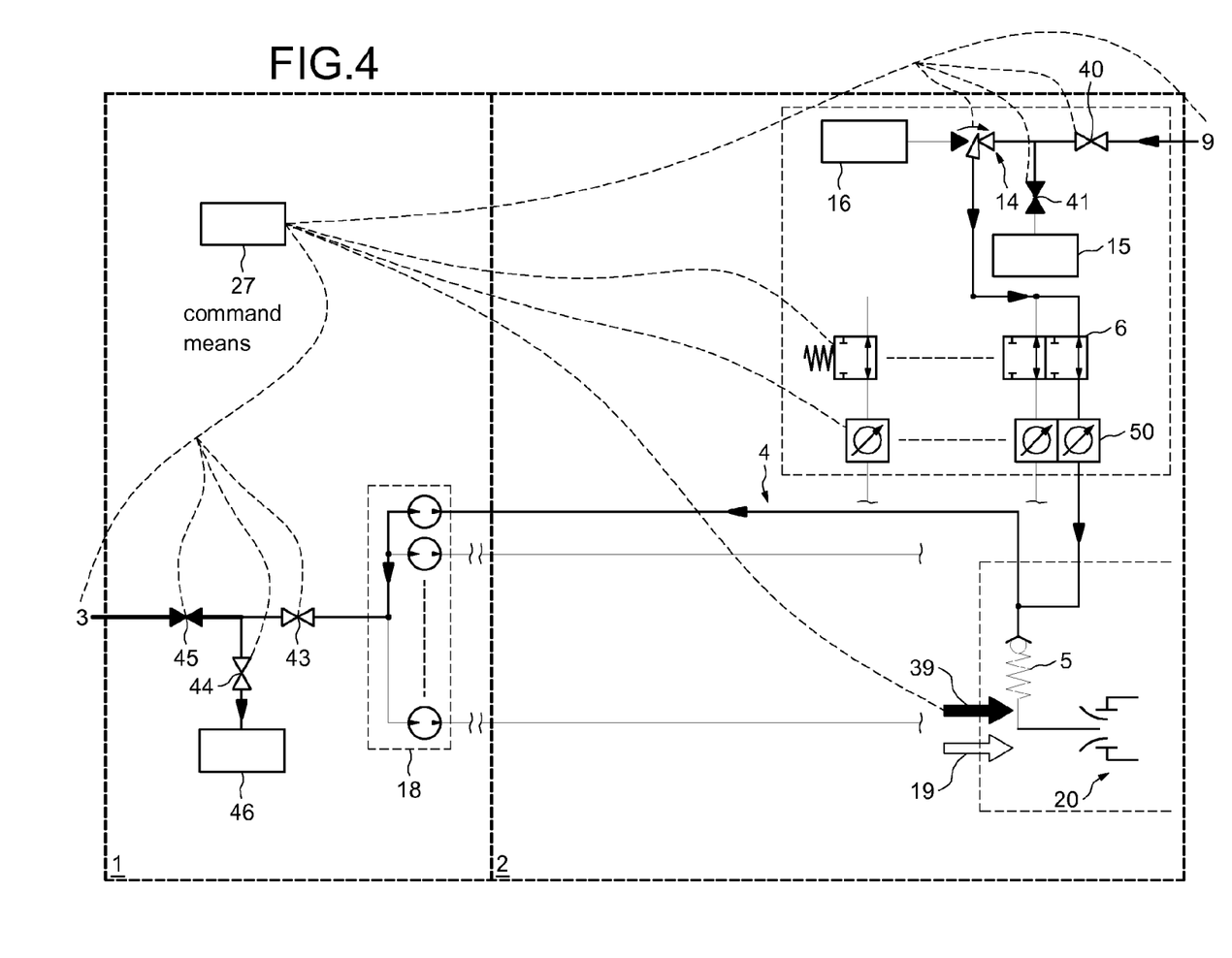
FIG. 4 illustrates, according to a first embodiment, the draining of the liquid fuel upstream of the non-return valve elements.

As shown in FIG. 4, the second step begins with the opening of the valve 43. Thus the piping assembly 4 upstream of the non-return valve element 5 is at atmospheric pressure. The water, the pressure of which is below the overcoming pressure, no longer opens the non-return valve element and is directed towards the drain 46. The whole of this portion of the piping assembly upstream of the non-return valve element up to the drain 46 is thus drained. The draining of the water via the draining air inlet 39 begins while the non-return valve elements are not closed and thus allows the remaining water from the first draining step to be drained downstream of the non-return valve elements 5 including in the injectors 20.

Figure 5:
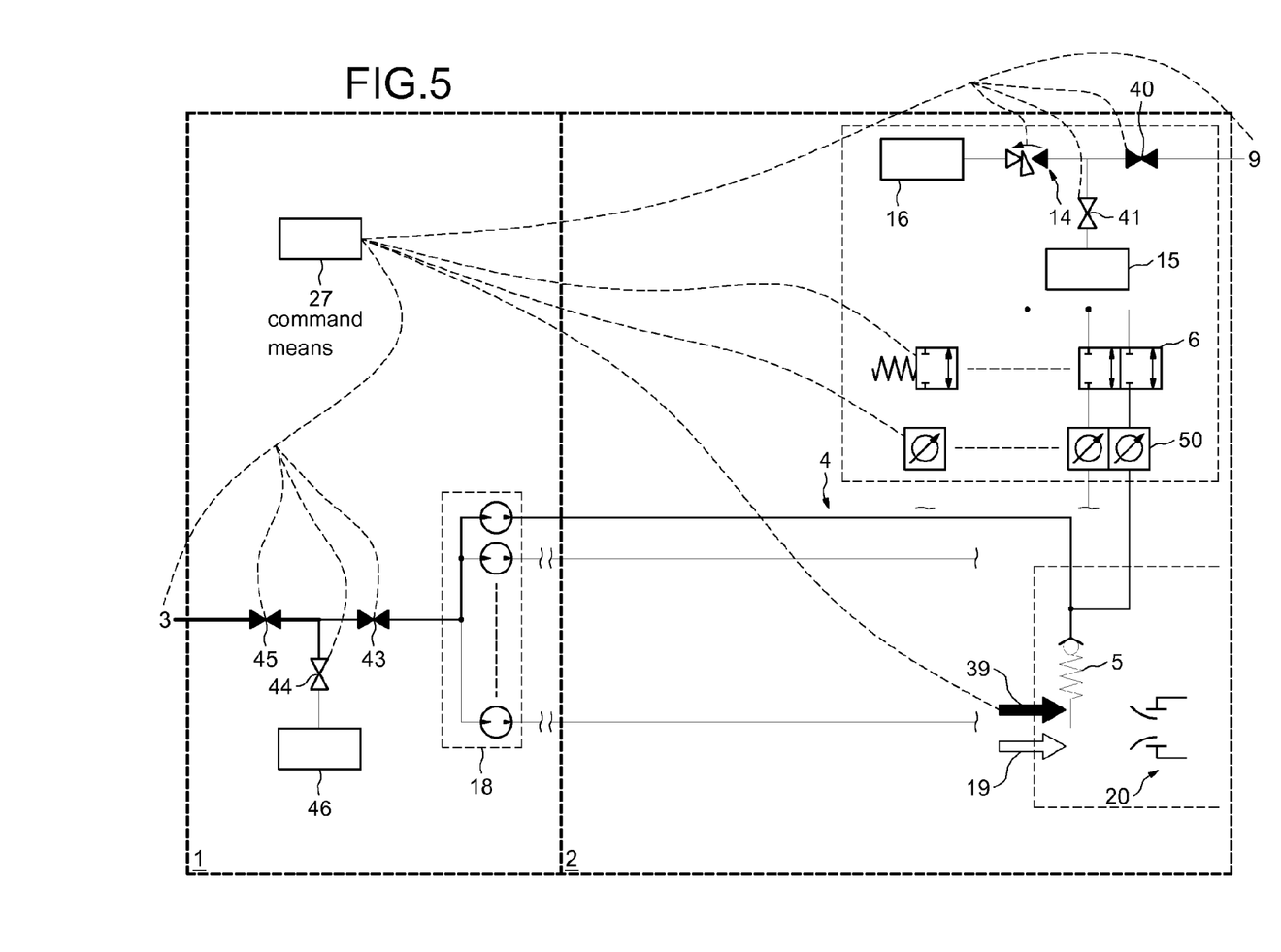
FIG. 5 illustrates, according to a first embodiment, the draining of the liquid fuel during which the draining system is stopped.

FIG. 5 represents the third and last step for draining the liquid fuel; this corresponds to the stopping of the supply system. The valves 40, 43 and 6 are closed while the valves 41 and 44 are opened. The residual water therefore remains in a portion of the piping assembly upstream of the non-return valve element 5. Downstream of the non-return valve element 5, the injection of air through the draining air inlet 39 continues and the portion of the piping assembly and the injectors 20 are therefore cleaned. The liquid fuel supply circuit can remain stopped in this configuration without risk of damage.

Figure 6:
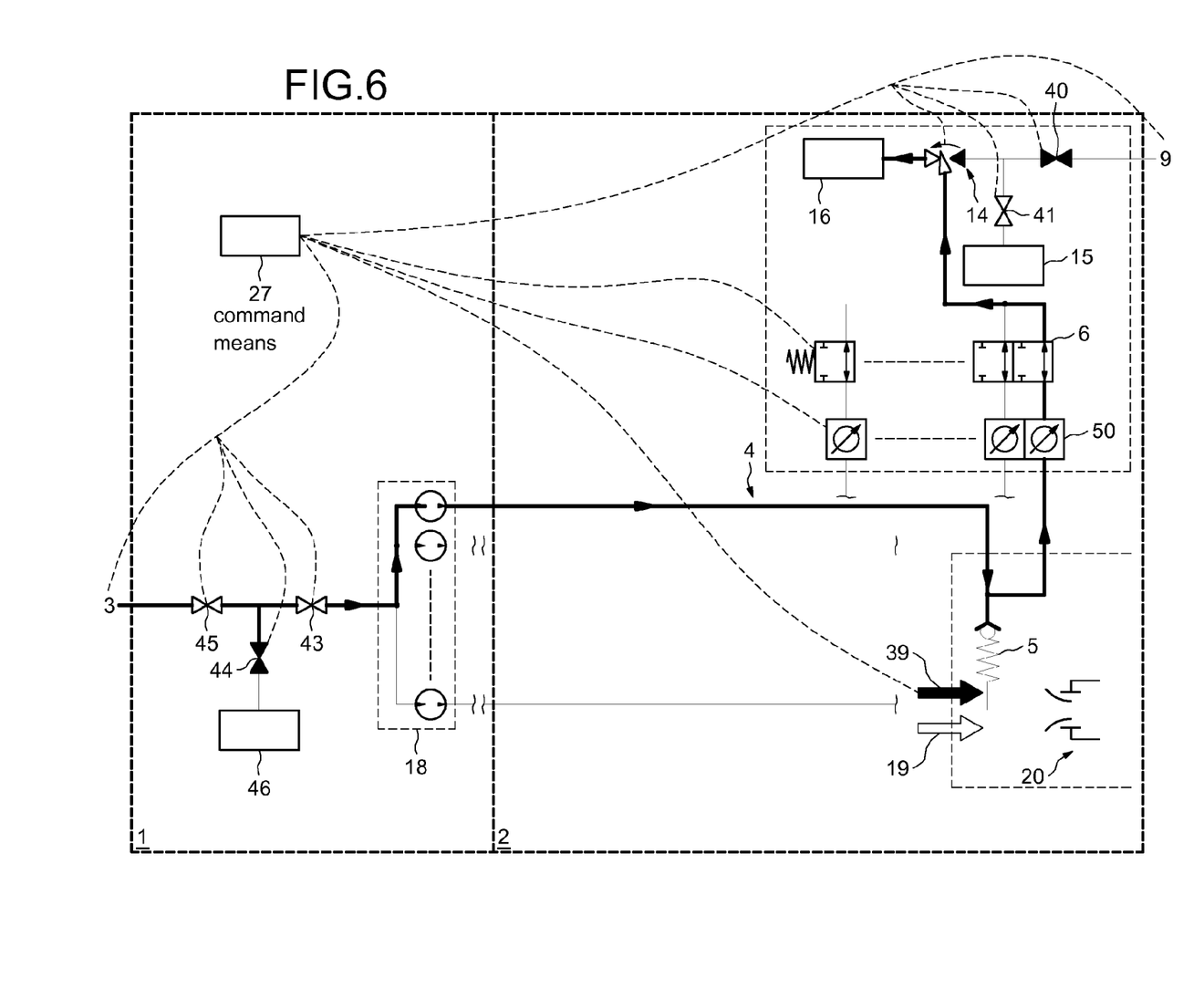
FIG. 6 illustrates, according to a first embodiment, the draining of the water during filling with the liquid fuel.

As shown in FIG. 6, the valves 6, 43 and 45 are opened, the valve 44 is closed and the valve 14 connects the multi-way valve 6 to the drain 16. The supply circuit is filled with liquid fuel. The water, pushed by the liquid fuel, is therefore drained. The liquid fuel inlet 3 operates at low pressure so that the non-return valve elements are not opened. The draining air inlet 39 continues downstream of the non-return valve elements.

Then, following this draining of the water by filling with liquid fuel, the draining air inlet 39 is stopped and the atomization air inlet 19 is started. With the valve 6 being closed, the system is again in the same configuration as in FIG. 2, ready to operate.

Figure 7:
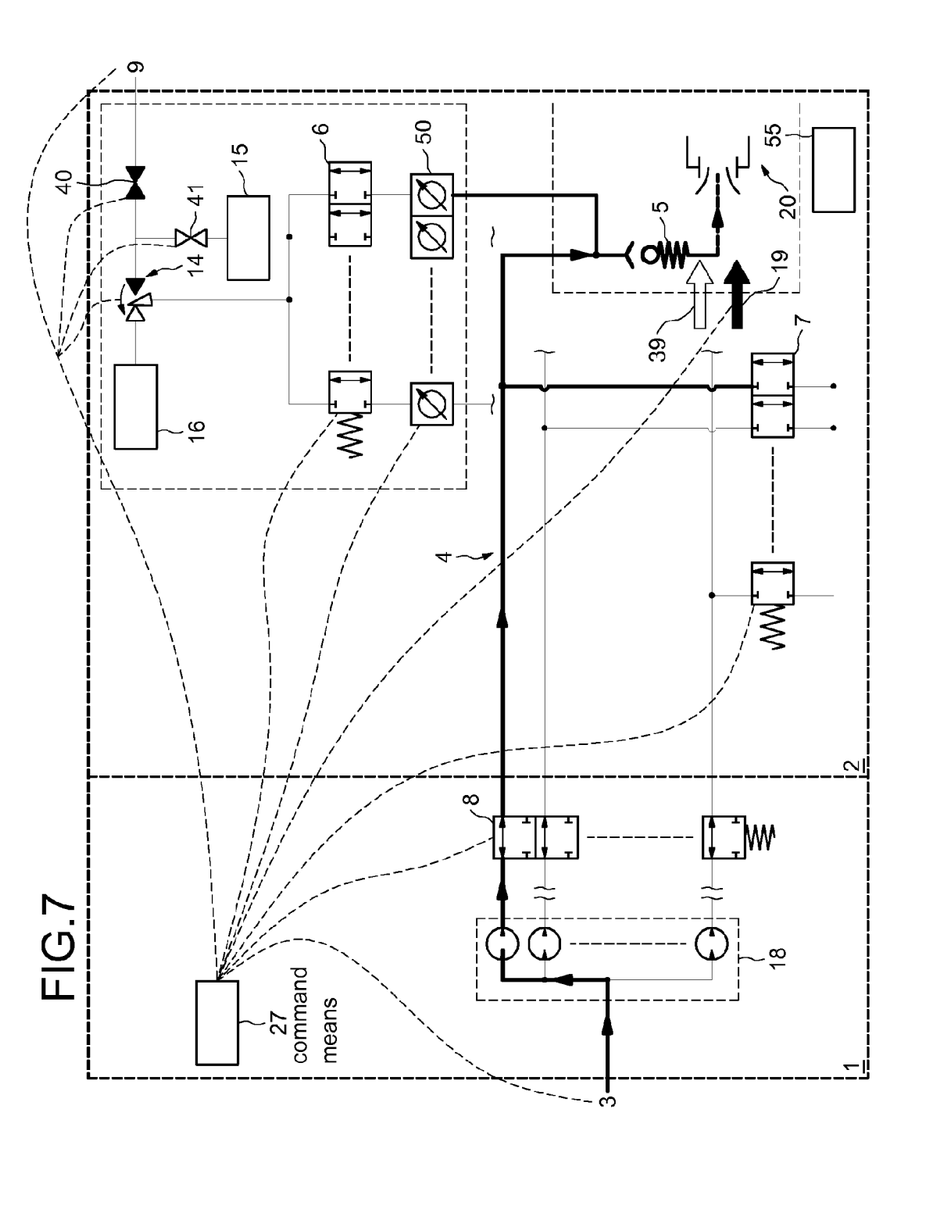
FIG. 7 illustrates, according to a first embodiment, the supplying system according to a second embodiment with the addition of means allowing draining to be performed.

FIG. 7 represents draining means according to another embodiment. In this embodiment, the draining system comprises three multi-way valves, namely a first valve 6, a second valve 7, and a third valve 8, a draining air inlet 39, a water inlet 9, three drains 55, 15 and 16, a flow regulator 50 and command means 27. The third valve 8 is installed in the auxiliary compartment while the first and second valves 6 and 7 are installed in the turbine compartment 2.

The first water inlet valve 6 is placed between the water inlet 9 and the piping assembly.

The second valve 7 is placed between the piping assembly and the drain 55. The third valve 8 is interposed in the piping assembly, downstream of the fuel inlet 3.

Preferably, the connection point of the first valve 6 is close to the non-return valve element 5. Similarly, the connection points of the first valve 6 and of the second valve 7 to the piping assembly are such that the water draining is carried out in zones close to the turbine that are high-temperature zones.

The water inlet 9 upstream of the first valve 6 makes it possible, for example by means of a water pump which may be that of the water injection circuit, to supply the water flow and pressure necessary for the draining system.

As can be seen in FIG. 7, the draining system again comprises a fourth three-way valve 14, the valve 14 making it possible to connect the valve 6 either to the drain 16 or to the water inlet 9. Downstream of the valve 14 and of the valve 6, each of the lines is connected to a liquid fuel line of the piping assembly 4 via the flow regulator 50.

As in the previous embodiment, additional single valves are installed. Thus a valve 40 is placed between the water inlet and the valve 14 while, between the valves 40 and 14, there is the connection point of a valve 41 that is connected to the drain 15. These single valves 40, 41 have the same role of isolating the liquid fuel circuit from the water and the water circuit from the liquid fuel as in the previous embodiment. They are therefore not necessary at the fuel oil inlet, since the oil does not return in this embodiment to the flow divider.

The system of valves 40, 41, 6, 7, 8, 14, the water inlet 9, the fuel inlet 3, the draining air inlet 39, the atomization air inlet 19 and the flow regulator 50 can all be controlled by the command means 27 in order to put in place a liquid fuel supply configuration for the turbine or configurations for draining the system.

In a configuration corresponding to a supply of the turbine with liquid fuel, the flow of liquid fuel is constant, the third valve 8 is opened, the first and second valves 6 and 7 remaining closed. The fourth valve 14 connects the first valve 6 to the drain 16, the valve 41 is open to the drain and the valve 40 is closed.

The connection-point zone of the valve 6 is situated upstream of the non-return valve element 5 but downstream of the connection-point zone of the second valve 7. Here again, as appropriate, the two fuels used with the turbine may be a fuel oil with respect to the liquid fuel and gas with respect to the other fuel. The water inlet 9 can be taken from the water injection system.

Figure 8:
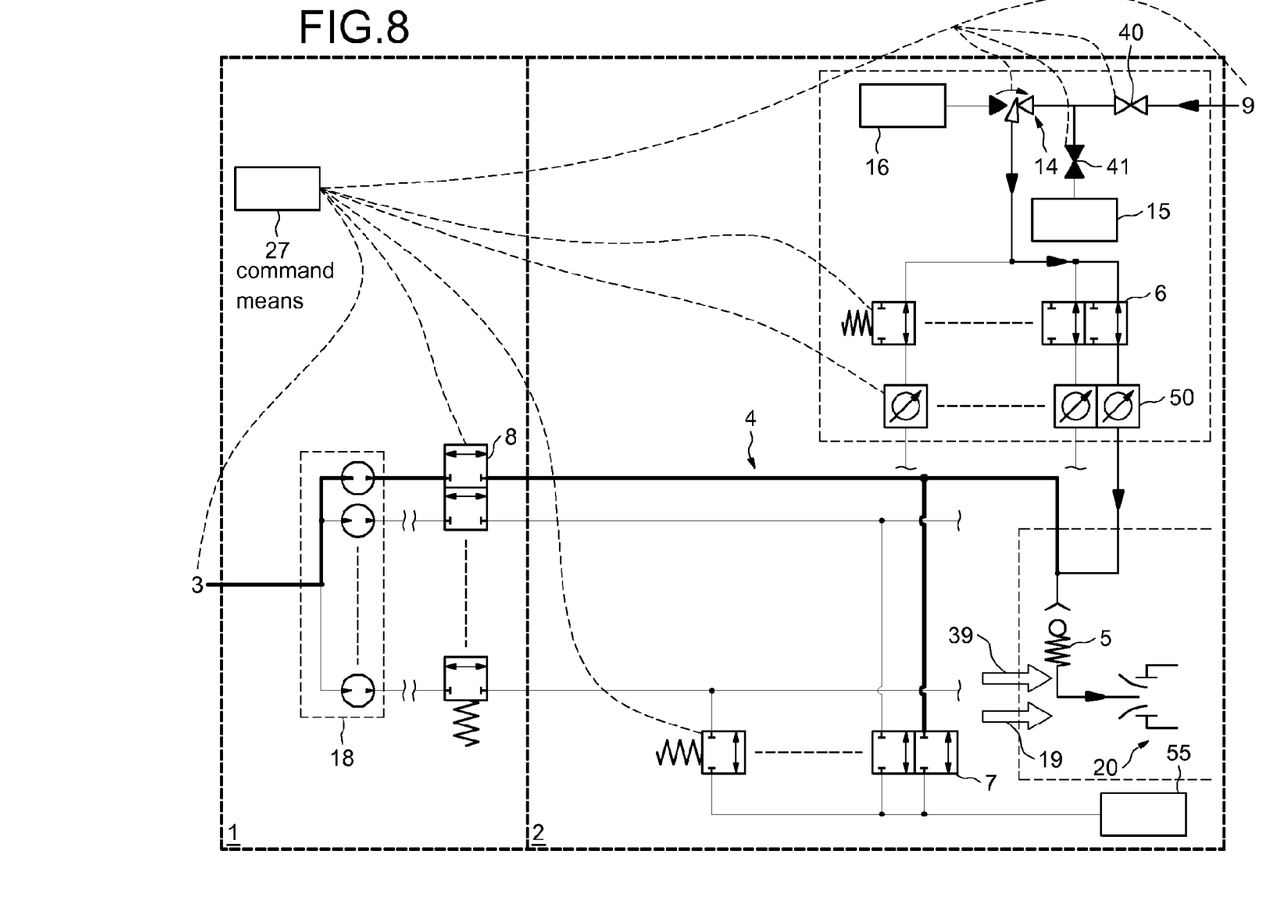
FIG. 8 represents a second embodiment of the draining of the liquid fuel downstream of the non-return valve elements.

Considering FIG. 8, the latter describes in detail the first step of the draining of the liquid fuel.

Following the stopping of the supply circuit and of the inlet of the liquid fuel, for example in the case of a fuel changeover, the first draining step begins with the closure of the second valve 7, of the third valve 8 and of the atomization air inlet 19. The three-way valve 14 connects the multi-way valve 6 to the water inlet 9. The valve 41 is closed while the valve 40 is opened. The water circuit is stopped by the liquid fuel and is directed towards the non-return valve element 5. The pressure of the water inlet 3, higher than the overcoming pressure, then allows the non-return valve element 5 to be opened and the draining of the residual fuel in the portion of the piping assembly starting from the connection point of the first valve 6 up to the portion of the piping assembly after the non-return valve element. This injection of water acts by its flow, its temperature and its composition on the traces of fuel and allows them to be flushed out.

Figure 9:
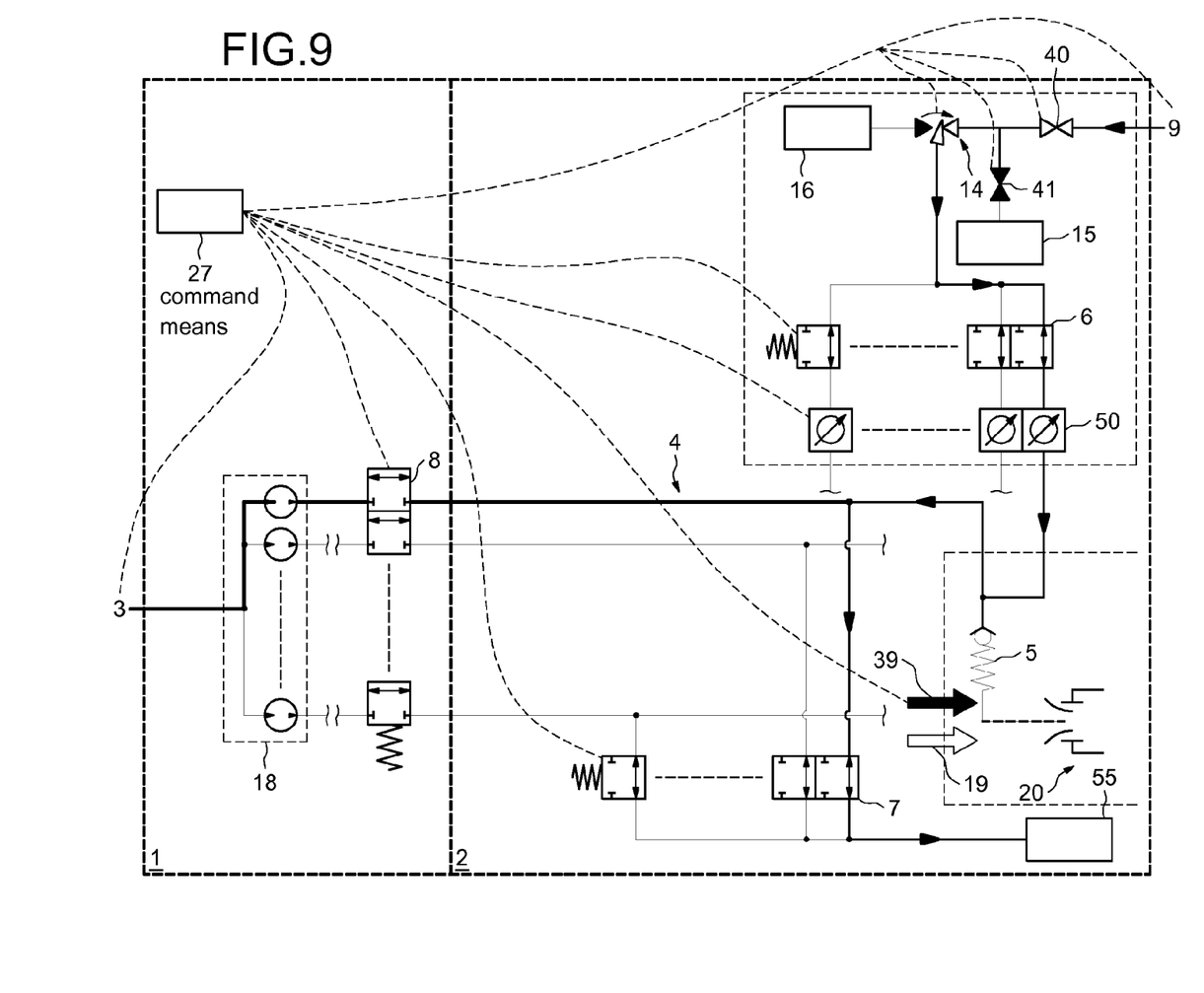
FIG. 9 represents a second embodiment of the draining of the liquid fuel upstream of the non-return valve elements.

Now considering FIG. 9, the latter describes the second step of the draining of the liquid fuel. This second step begins with the opening of the second valve 7. Thus the portion of the piping assembly upstream of the non-return valve element 5, from the connection point of the first valve to the drain 55, passing through the second valve 7, is at atmospheric pressure. This portion is then drained of the liquid fuel by the injection of water. While the valve elements are closed, the draining of the water through the draining air inlet 39 begins. This operation allows a draining of the remaining water of the first draining step in the whole portion of the piping assembly downstream of the non-return valve elements 5, including in the injectors 20.

Figure 10:
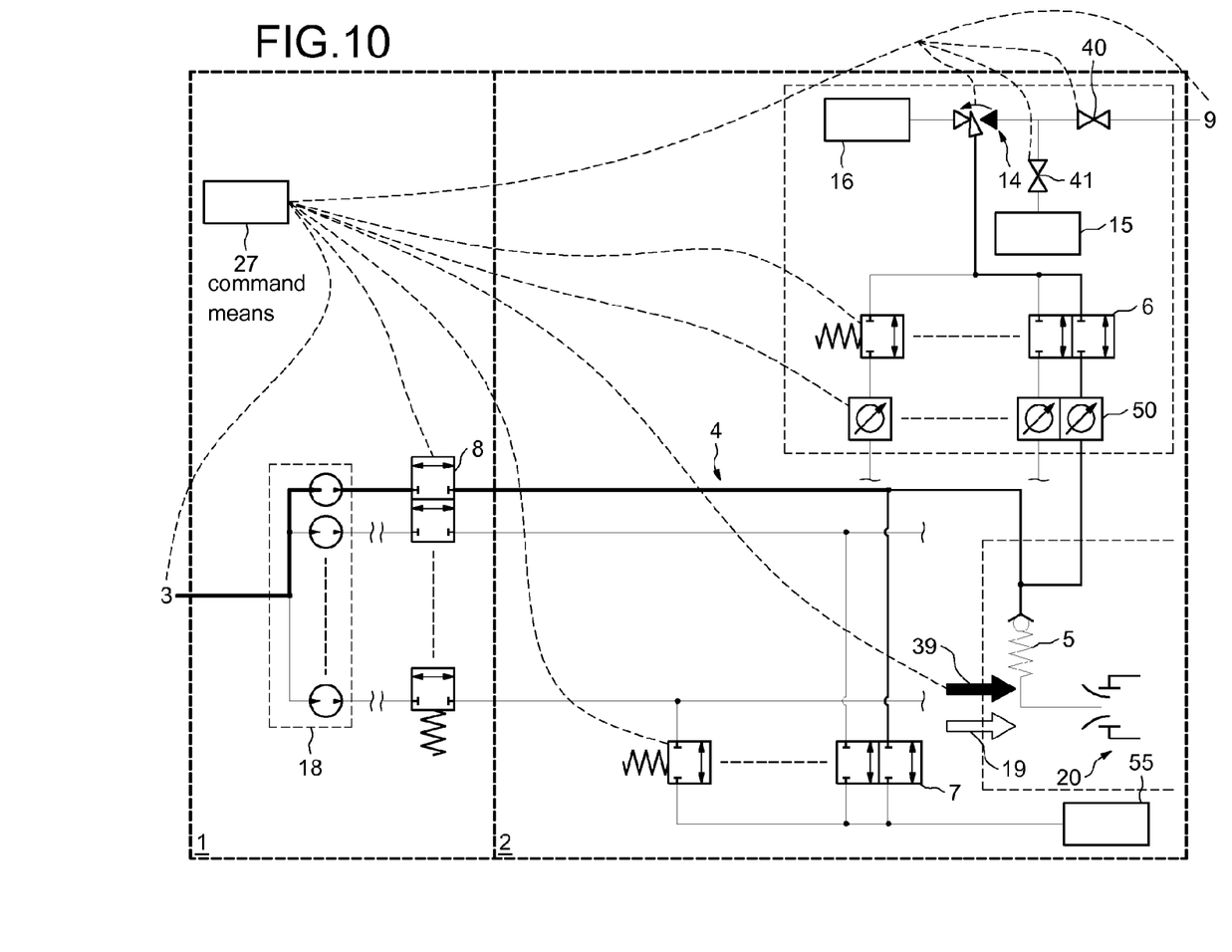
FIG. 10 represents a second embodiment of the draining of the liquid fuel during which the draining system is stopped.

Considering FIG. 10, the latter describes the third step of the draining of the liquid fuel during which the draining system is stopped. The valves 6, 7 are closed. The residual water therefore remains in a portion of the piping assembly upstream of the non-return valve element 5. The valve 41 is opened and the valve 40 is closed. Downstream of the valve element, with the draining by injection of draining air continuing, the injectors 20 and the portion of the piping assembly downstream of the non-return valve element are cleaned. The liquid fuel supply circuit can therefore remain stopped in this configuration without risk of damage.

Figure 11:
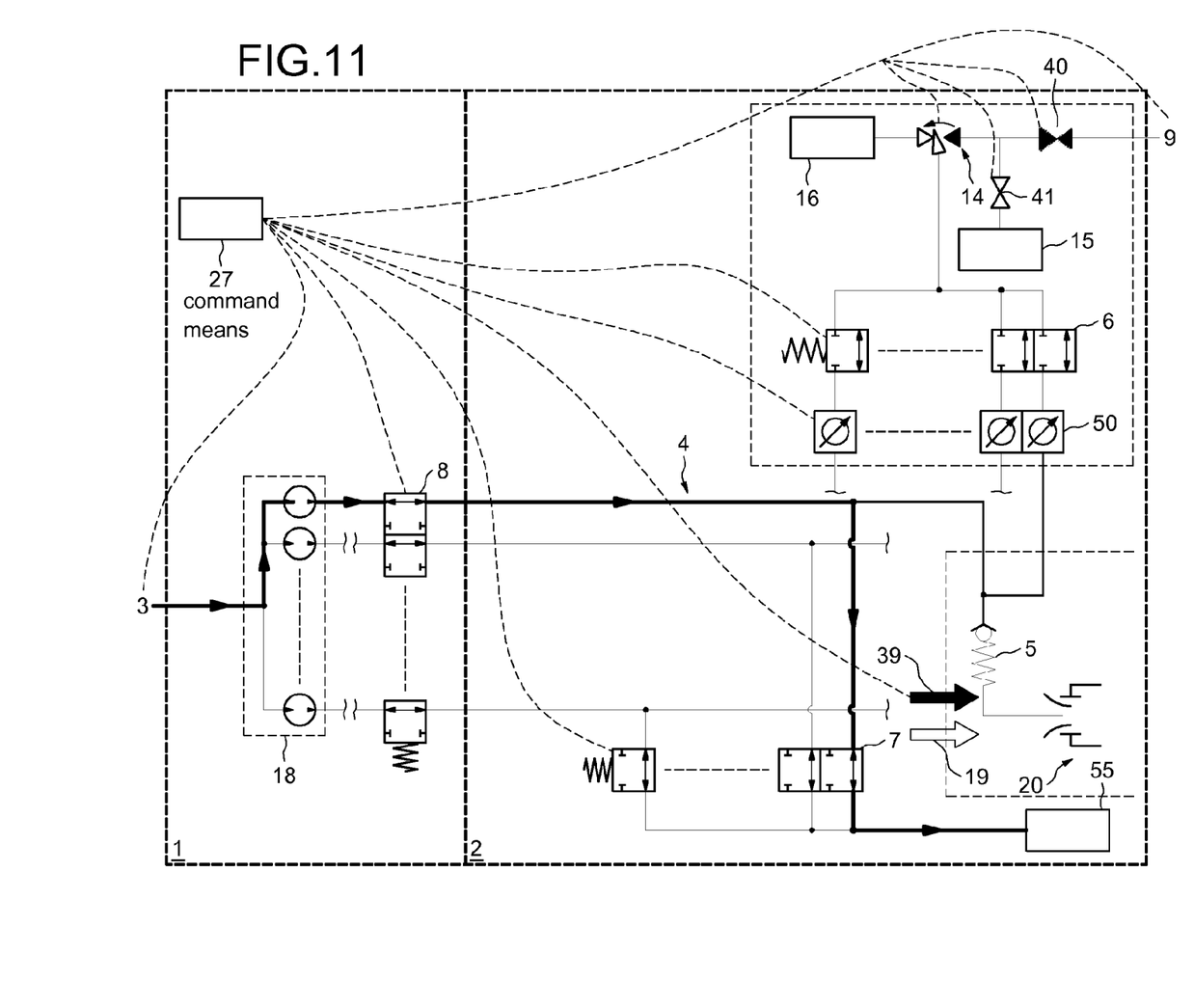
FIG. 11 represents a second embodiment of the first step of the draining of the water during filling with the liquid fuel.

Considering FIG. 11, the latter depicts the first step of the draining of water when filling with liquid fuel. During this step, the valves 7 and 8 are opened, the first valve 6 being closed. The valve 41 is opened while the valve 40 is closed. The water is thus drained and replaced with the liquid fuel, from the valve 8 to the drain 55, passing through the valve 7, the fuel inlet being started at low pressure. Downstream of the non-return valve element 5, the injection of draining air 39 continues.

Figure 12:
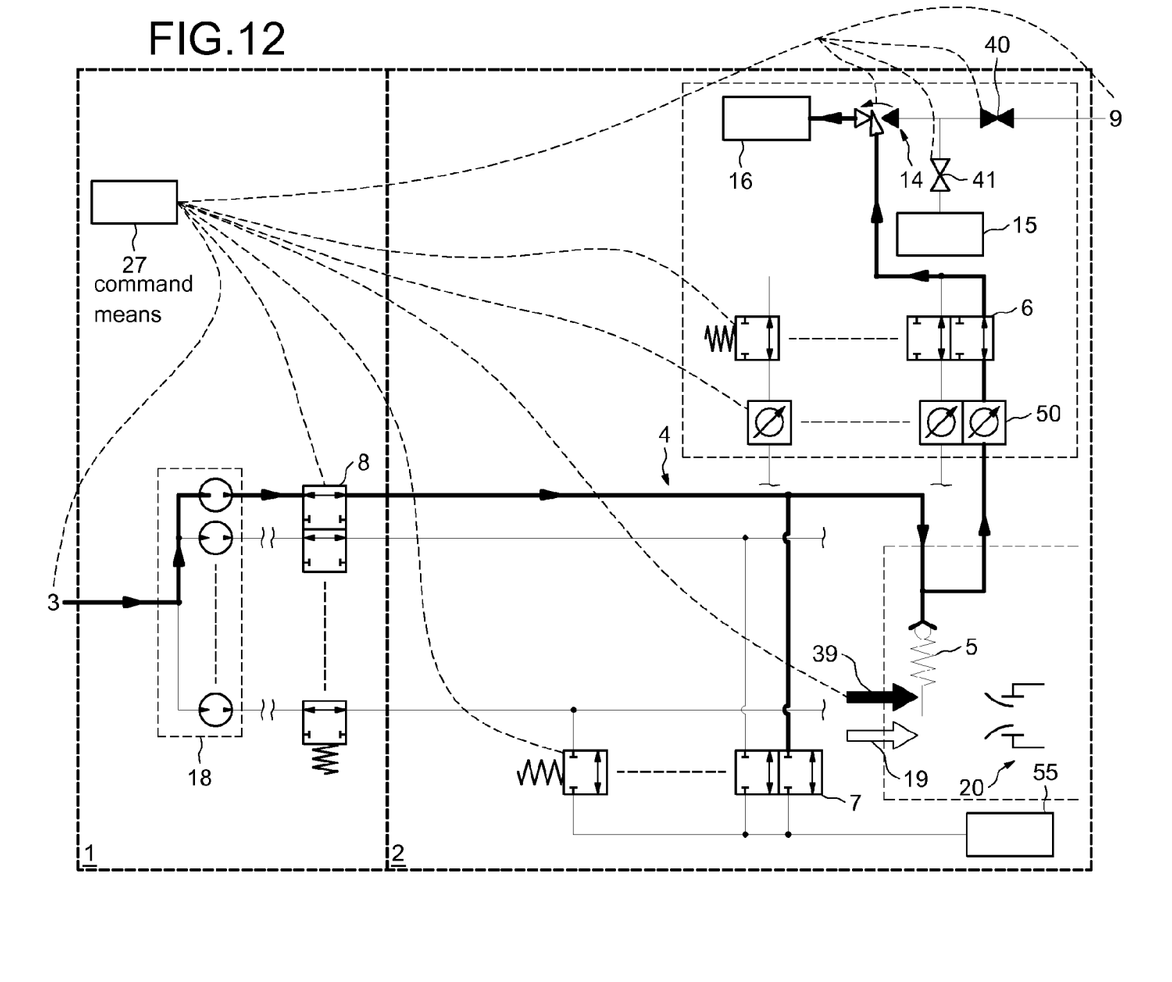
FIG. 12 represents a second embodiment of the second step of draining the water during filling with the liquid fuel.

Considering FIG. 12, the latter depicts the second step of draining water when filling with liquid fuel. The first valve 6 is opened, the second valve 7 is closed and the fourth valve 14 connects the first valve 6 to the drain 16. The valve 40 is closed while the valve 41 is opened. With the liquid fuel inlet continuing to operate at low pressure, this allows the water to be pushed without opening the non-return valve elements. Thus, the water is replaced and drained by the liquid fuel in the portion of the piping assembly from the connection point of the valve 7 up to the drain 16, passing through the valves 6 and 14. Downstream of the non-return valve element 5, the injection of draining air 39 continues.

Then, the injection of draining air is stopped and the injection of atomization air begins. The valves 6 and 7 are closed, the liquid fuel supply circuit is isolated from the water, the fuel inlet is restarted, the supply system is then in the same configuration as in FIG. 7, that is to say ready to be used.

The draining time is not a critical factor in the process. However, draining must begin immediately after the supply circuit is stopped due, as appropriate, to the changeover from the first fuel to the second fuel. The time for filling the circuit with liquid fuel is minimized so as not to impact on the changeover time notably in the case of an unplanned restarting of the liquid fuel circuit. As can be seen, the invention that has just been described makes it possible to simultaneously drain the stagnant liquid fuel and to clean the supply system, in the high-temperature zone.

The operating sequence of the draining system complies with the operation of the machine during the fuel changeover and ensures a rapid resumption of the supply line following this operation.

This invention can form part of all the possible combustion modes of the various machines.

The invention claimed is:

1. A system for supplying a gas turbine system with liquid fuel, comprising:
    a liquid fuel inlet;
    a piping assembly that connects the liquid fuel inlet to the gas turbine system;
    a draining system for draining at least a portion of the piping assembly, wherein the draining system comprises a water inlet and a system of controllable valves suitable for injecting water into at least a portion of the piping assembly;
    a non-return valve element placed between the liquid fuel inlet and the gas turbine system, wherein the system of controllable valves is connected upstream of the non-return valve element;
    a pressurized draining air inlet placed downstream of the non-return valve element; and
    a controller configured to control the pressurized draining air inlet so that an injection of air is performed subsequent to an injection of water downstream of the non-return valve element.

2. The system according to claim 1, wherein the gas turbine system comprises a water supply and wherein the water inlet is supplied from the water supply.

3. The system according to claim 1, wherein the controller is configured to control the system of controllable valves according to a first supplying phase for supplying the gas turbine system with fuel and a second draining phase for draining by the injection of water into the portion of the piping assembly.

4. The system according to claim 1, wherein the system of controllable valves comprises a three-way valve connecting either a drain or the water inlet to a multi-way water inlet valve connected to the piping assembly.

5. The system according to claim 1, wherein the system of controllable valves comprises a first multi-way valve connected between the piping assembly and the water inlet, a second valve placed between the piping assembly and a drain, and a third valve placed in the piping assembly downstream of the liquid fuel inlet.

6. The system according to claim 5, further comprising a three-way valve placed between the first multi-way valve and the water inlet in order to connect the first multi-way valve either to the drain or to the water inlet.

7. The system according to claim 5, wherein a connection point of the first multi-way valve is situated downstream of a connection point of the second valve.

8. The system according to claim 5, further comprising a flow regulator placed between the first multi-way valve and the piping assembly.

9. The system according to claim 1 for supplying the gas turbine system with at least two fuels, wherein a first fuel is fuel oil and a second fuel is gas.

10. A gas turbine system comprising the system of claim 1.

* * * * *